Feb. 23, 1954 — G. F. GARDNER ET AL — 2,669,873
FLOWMETER
Filed March 22, 1950
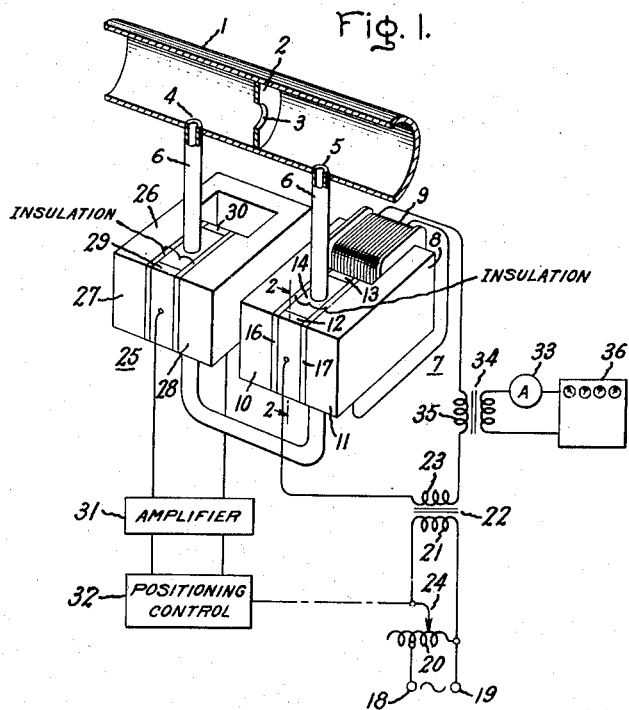
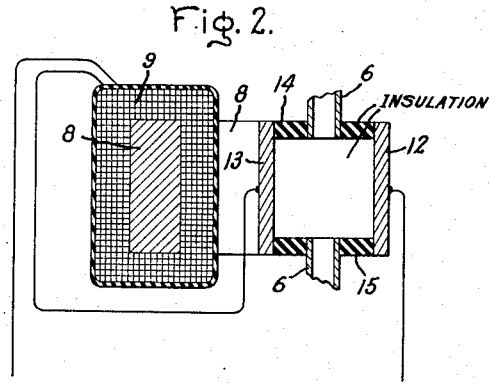
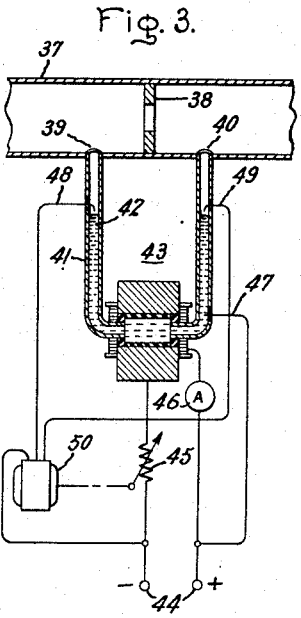
Inventors:
George F. Gardner,
Theodore A. Rich,
by Paul A. Frank
Their Attorney.

Patented Feb. 23, 1954

2,669,873

UNITED STATES PATENT OFFICE 2,669,873

FLOWMETER

George F. Gardner, Scotia, and Theodore A. Rich, Schenectady, N. Y., assignors to General Electric Company, a corporation of New York Application March 22, 1950, Serial No. 151,141

10 Claims. (Cl. 73—205)

This invention relates to apparatus for measuring the flow of fluids.

An object of the invention is to provide an improved remote-indicating flow meter which involves no moving parts and no empirical correction devices.

Another object is to provide an improved flow meter in which the liquid may be confined in an all-metal, all-welded container, thereby providing increased safety and reliability in measuring the flow rate of corrosive or otherwise dangerous fluids.

Other objects and advantages will appear as the description proceeds.

In the improved flow meter, a differential pressure having a magnitude related to the flow rate is produced between two points along the length of a conduit or flow line by conventional flow constricting means. A branch passageway connects these two points; and the pressure differential tends to produce fluid flow through this passageway. An opposing differential pressure of adjustable magnitude is provided by an electromagnetic pump connected to the passageway. Flow-responsive detecting means and a control mechanism operate in response to any fluid flow through the passageway to adjust the amount of electric current applied to the electromagnetic pump, and thereby control the differential pressure produced by the pump, to prevent substantial flow of fluid through the passageway.

The electromagnetic pumps referred to in this specification are of the type in which a magnetic field is provided transversely through a passageway containing an electrically conductive fluid, and an electric current is passed through the fluid perpendicular to the magnetic field. This produces a differential pressure in the fluid which is proportional to the product of magnetic field intensity and the amount of such electric current.

The features of this invention which are believed to be novel and patentable are pointed out in claims which form a part of this specification. For a better understanding of the invention, reference is made in the following description to the accompanying drawing, in which Fig. 1 is a schematic diagram of an improved flow meter; Fig. 2 is a section along line 2—2 of Fig. 1; and Fig. 3 is a schematic diagram of another improved flow meter.

Referring now to Fig. 1, an electrically conductive fluid to be metered may flow from left to right through conduit 1. In the conduit there is a flow constricting means, which may be a disc 2 having an orifice 3, as shown. As fluid flows through the conduit, the constricting means produces a differential pressure between points 4 and 5 which is substantially proportional to the square of the fluid flow rate.

A tube 6 defines a branch passageway between points 4 and 5. The differential pressure between these two points tends to produce fluid flow through the branch passageway. Connected to tube 6 is an electromagnetic pump 7 which produces a differential pressure through the fluid within the branch passageway. This pressure opposes the differential pressure between points 4 and 5, and thus substantially prevents fluid flow through tube 6, as is hereinafter more fully explained.

Referring now to Figs. 1 and 2, the electromagnetic pump may comprise an electromagnet having a core member 8 and a winding 9. Between the pole pieces 10 and 11 of this electromagnet, there is a chamber defined by walls comprising metal electrodes 12 and 13 and insulating members 14, 15, 16 and 17, as shown. Tube 6 is connected to this chamber, so that fluid within the tube also fills the chamber, and so that any fluid flowing through the tube also flows through the chamber. The insulating members need not be electrical insulators in an absolute sense. It is sufficient that their electrical conductivity be adequately low with respect to the electrical conductivity of the fluid that a substantial portion of the electric current which passes between electrodes 12 and 13, as hereinafter explained, passes through the fluid rather than through the side walls of the chamber. The insulating members may, for example, be constructed of low conductivity metal, or other suitable material.

Alternating current from a suitable source is applied, through terminals 18 and 19 and autotransformer 20, to the primary winding 21 of a transformer 22, which has a secondary winding 23. One terminal of secondary winding 23 is connected to electrode 12, and the other terminal of the secondary winding is connected through winding 9 to electrode 13. Electric current flows through secondary winding 23 to electrode 12, through the conductive fluid to electrode 13, through winding 9, and then back to secondary winding 23. The current through winding 9 provides a magnetic field between pole pieces 10 and 11 perpendicular to the electric current flow through the fluid. This creates a differential pressure in the fluid within tube 6 which opposes the differential pressure between points 4 and 5. The magnetic field provided is proportional to the amount of current; and, since the amount of differential pressure produced is proportional to the product of current and magnetic field intensity, the differential pressure is substantially proportional to the square of the amount of current supplied to the pump. The amount of this current, and, hence, the amount of differential pressure provided, may be controlled by adjusting a tap 24 on autotransformer 20.

A flow detector 25 is connected to tube 6 in responsive relation to fluid flow therethrough. Flow detector 25 may comprise a permanent magnet 26, having pole pieces 27 and 28, which provides a magnetic field transversely through the conductive fluid. A fluid chamber having electrodes 29 and 30 is provided between pole pieces 27 and 28, which may be of the same construction as the electromagnetic pump fluid chamber. Any flow of electrically conductive fluid through tube 6 produces a voltage gradient through the fluid perpendicular to the direction of flow and also perpendicular to the direction of the magnetic field between pole pieces 27 and 28. This provides a voltage between electrodes 29 and 30 which is substantially proportional to the rate of fluid flow through tube 6, and which has a polarity determined by the direction of such flow.

The voltage between electrodes 29 and 30 is amplified by an amplifier 31. The amplified voltage operates conventional positioning-control apparatus 32 to adjust the position of tap 24, and thereby controls the amount of current supplied to pump 7. In this manner, the differential pressure provided by pump 7 is kept substantially at the correct value exactly to counteract the differential pressure between points 4 and 5, which substantially prevents the flow of fluid through tube 6.

The amount of electric current supplied to pump 7 to prevent fluid flow through tube 6 is related to the rate of fluid flow through conduit 1. This relation is a linear one, because the differential pressure between points 4 and 5 is substantially proportional to the square of the flow rate, and the differential pressure provided by pump 7 is substantially proportional to the square of the electric current supplied to the pump. The linear relation is advantageous because it permits easy automatic integration of flow rate values without the use of empirical correction devices.

The amount of current supplied to pump 7 is indicated by an ammeter 33 connected to an instrument transformer 34, which has a primary winding 35 electrically connected in series with winding 9, as shown. The scale of the ammeter may be calibrated to read directly in flow rate units. An integrating meter, such as ampere hour meter 36, may also be employed to indicate the total flow of fluid through conduit 1 over a period of time. It will be appreciated that other means, such as recorders or control apparatus, can be employed in lieu of, or in combination with, ammeter 33 and ampere hour meter 36.

A flow meter for measuring the flow of electrically nonconductive fluids is illustrated in Fig. 3. The nonconductive fluid may flow from left to right through a conduit 37 in which there is a flow constricting means 38. This fluid flow creates a pressure differential between points 39 and 40. A tube 41 defines a branch passageway between points 39 and 40. A portion of this tube is filled with an electrically conductive fluid 42, such as mercury. An electromagnetic pump 43 is connected to tube 41 to provide a differential pressure through fluid 42 in opposition to the differential pressure between points 39 and 40. This pump may be operated with alternating or direct current supplied through terminals 44. The amount of this current is controlled by a variable series resistor 45, and is measured by an ammeter 46.

A first electrode 47 is in electrical contact with conductive fluid 42. Second and third electrodes 48 and 49 are positioned within tube 41 adjacent to respective ends of the portion thereof which contains the conductive fluid, as shown. If the differential pressure provided by pump 43 is not sufficiently great to counteract the differential pressure between points 39 and 40, fluid 42 tends to flow through the tube and rises in the right-hand leg of tube 41 until it contacts electrode 49. This completes an electric circuit through reversible electric motor 50, which operates to reduce the resistance of resistor 45 and supply more current to pump 43. The adjusting action continues until the two opposed differential pressures are equal, whereupon fluid 42 returns to the position shown in the drawing, thereby opening the electric circuit. If the differential pressure supplied by pump 43 is too great, the liquid rises in the left-hand leg of tube 41 and makes contact with electrode 48. This closes an electric circuit which operates motor 50 in the reverse direction to reduce the current supplied to pump 43.

Having described the principle of this invention and the best mode in which we have contemplated applying that principle, we wish it to be understood that the apparatus described is illustrative only, and that other means can be employed without departing from the true scope of the invention.

What we claim as new and desire to secure by Letters Patent of the United States is:

1. In combination, means defining a fluid passageway to contain an electrically conductive fluid, an electromagnetic pump formed by an electromagnet comprising a core member having extensions therefrom defining a pair of pole pieces that surround a portion of the passageway, a pair of current electrodes disposed on opposite sides of said portion of the passageway and contacting the fluid flowing therethrough, and a current supply winding surrounding said core member, the electromagnetic pump thus comprised serving to provide a differential fluid pressure through said passageway, means to supply electric current to said current supply winding and said current electrodes, the amount of such differential pressure being related to the amount of such current, means responsive to fluid flow within said passageway for adjusting the value of such current to control the differential pressure provided by said pump substantially to prevent such flow, and indicating instrument means coupled to said current supply means for deriving an indication of the current flow.

2. A flow meter comprising a conduit, means defining a fluid passageway to contain an electrically conductive fluid connected at its ends to respective points along the length of said conduit, flow-constricting means within said conduit for producing a differential fluid pressure between the ends of said passageway, such pressure being related to the rate of fluid flow through said conduit, an electromagnetic pump formed by an electromagnet comprising a core member having extensions therefrom defining a pair of pole pieces that surround a portion of the passageway, a pair of current electrodes disposed on opposite sides of said portion of the passageway and contacting the fluid flowing therethrough, and a current supply winding surrounding said core member, the electromagnetic pump thus comprised serving to provide a differential fluid pressure through said passageway in opposition to the differential pressure produced by fluid flow through the conduit, means to supply electric current to said current supply winding and said current electrodes, the amount of differential pressure provided by the pump being related to the amount of such current, means responsive to fluid flow within said passageway for adjusting the value of such current to control the differential pressure provided by said pump substantially to prevent such flow, and indicating instrument means coupled to said current supply means for deriving an indication of the current flow.

3. In combination, means defining a fluid passageway to contain an electrically conductive fluid, an electromagnetic pump formed by an electromagnet comprising a core member having extensions therefrom defining a pair of pole pieces that surround a portion of the passageway, a pair of current electrodes disposed on opposite sides of said portion of the passageway and contacting the fluid flowing therethrough, and a current supply winding surrounding said core member, the electromagnetic pump thus comprised serving to provide a differential fluid pressure through said passageway, means to supply electric current to said current supply winding and said current electrodes, the amount of such differential pressure being related to the amount of such current, an electromagnetic flow meter connected in responsive relation to fluid flow within said passageway, and control means operated by said flow meter for adjusting the value of such current to control the differential pressure provided by said pump substantially to prevent such flow, and indicating instrument means coupled to said current supply means for deriving an indication of the current flow.

4. A flow meter comprising a conduit, means defining a fluid passageway to contain an electrically conductive fluid connected at its ends to respective points along the length of said conduit, flow-constricting means within said conduit for producing a differential fluid pressure between the ends of said passageway, such pressure being related to the rate of fluid flow through said conduit, an electromagnetic pump formed by an electromagnet comprising a core member having extensions therefrom defining a pair of pole pieces that surround a portion of the passageway, a pair of current electrodes disposed on opposite sides of said portion of the passageway and contacting the fluid flowing therethrough, and a current supply winding surrounding said core member, the electromagnetic pump thus comprised serving to provide a differential fluid pressure in opposition to the differential pressure produced by fluid flow through the conduit, means to supply electric current to said current supply winding and said current electrodes, the amount of differential pressure provided by the pump being related to the amount of such current, an electromagnetic flow detector connected in responsive relation to fluid flow within said passageway, control means operated by said flow detector for adjusting the value of such current to control the differential pressure provided by said pump substantially to prevent such flow, and indicating instrument means coupled to said current supply means for deriving an indication of the current flow.

5. In combination, means defining a fluid passageway, an electrically conductive fluid filling a portion of such passageway, an electromagnetic pump formed by an electromagnet comprising a core member having extensions therefrom defining a pair of pole pieces that surround a portion of the passageway, a pair of current electrodes disposed on opposite sides of said portion of the passageway and contacting the fluid flowing therethrough, and a current supply winding surrounding said core member, the electromagnetic pump thus comprised serving to provide a differential pressure within said fluid, means to supply electric current to said current supply winding and said current electrodes, the amount of such differential pressure being related to the amount of such current, a first electrode in electrical contact with said fluid, second and third electrodes within said passageway adjacent to respective ends of the portion thereof which contains the conductive fluid, so that flow of said fluid in either direction completes an electric circuit between said first electrode and said second or third electrode selectively, control means operated by completion of such circuit for adjusting the value of current supplied to the pump substantially to prevent flow of said fluid, and indicating instrument means coupled to said current supply means for deriving an indication of the current flow.

6. A flow meter comprising a conduit, means defining a fluid passageway connected at its ends to respective points along the length of said conduit, flow-constricting means within said conduit for producing a differential fluid pressure between the ends of said passageway, such pressure being related to the rate of fluid flow through said conduit, an electrically conductive fluid filling a portion of said passageway, an electromagnetic pump formed by an electromagnet comprising a core member having extensions therefrom defining a pair of pole pieces that surround a portion of the passageway, a pair of current electrodes disposed on opposite sides of said portion of the passageway and contacting the fluid flowing therethrough, and a current supply winding surrounding said core member, the electromagnetic pump thus comprised serving to provide a differential fluid pressure in opposition to the differential pressure produced by fluid flow through the conduit, means to supply electric current to said current supply winding and said current electrodes, the amount of differential pressure provided by the pump being related to the amount of such current, a first electrode in electrical contact with said fluid, second and third electrodes within said passageway adjacent to respective ends of the portion thereof which contains the conductive fluid, so that flow of said fluid in either direction completes an electric circuit between said first electrode and said second or said third electrode selectively, control means operated by completion of such circuit for adjusting the value of current supplied to the pump substantially to prevent flow of said fluid, and indicating instrument means coupled to said current supply means for deriving an indication of the current flow.

7. In combination, means defining a fluid passageway for an electrically conductive fluid, an electromagnetic pump formed by an electromagnet comprising a core member having extensions therefrom defining a pair of pole pieces that surround a portion of the passageway, a pair of current electrodes disposed on opposite sides of said portion of the passageway and contacting the fluid flowing therethrough, and a current supply winding surrounding said core member, the electromagnetic pump thus comprised serving to provide a differential pressure counteracting the differential pressure normally tending to create a flow of fluid through said passageway, adjustable means supplying current to the current supply winding and the current electrodes of said electromagnetic pump of a value sufficient to prevent substantial flow of fluid through the passageway, the amount of such current being related to the differential pressure acting to create fluid flow through said passageway, means connected to said current supply means for indicating the value of the current required by said pump, and means responsive to fluid flow within said passageway and coupled to said adjustable means for causing said adjustable means to adjust the value of the current supplied to said pump.

8. A flow meter including in combination a conduit, means defining a fluid passageway connected at its ends to respective points along the length of said conduit, means positioned in said conduit for producing a differential fluid pressure between the ends of said passageway, such pressure being related to the rate of fluid flow through said conduit, an electromagnetic pump formed by an electromagnet comprising a core member having extensions therefrom defining a pair of pole pieces that surround a portion of the passageway, a pair of current electrodes disposed on opposite sides of said portion of the passageway and contacting the fluid flowing therethrough, and a current supply winding surrounding said core member, the electromagnetic pump thus comprised serving to provide a differential fluid pressure therethrough in opposition to the differential pressure produced by fluid flow through said conduit, means for supplying electric current to the current supply winding and the current electrodes of said pump, the amount of such current being related to the differential pressure provided by the pump, and means connected to said current supply means for indicating the value of the current required by said pump in order to prevent flow through said fluid passageway.

9. A flow meter including in combination a conduit, means defining a fluid passageway connected at its ends to respective points along the length of said conduit, means positioned in said conduit for producing a differential fluid pressure between the ends of said passageway, such pressure being related to the rate of fluid flow through said conduit, an electromagnetic pump formed by an electromagnet comprising a core member having extensions therefrom defining a pair of pole pieces that surround a portion of the passageway, a pair of current electrodes disposed on opposite sides of said portion of the passageway and contacting the fluid flowing therethrough, and a current supply winding surrounding said core member, the electromagnetic pump thus comprised serving to provide a differential fluid pressure therethrough in opposition to the differential pressure produced by fluid flow through said conduit, means for supplying electric current to the current supply winding and the current electrodes of said pump, the amount of such current being related to the differential pressure provided by the pump, means connected to said current supply means for indicating the value of the current required by said pump in order to prevent flow through said fluid passageway, and means responsive to fluid flow within said passageway for adjusting the valve of the current supplied to said pump.

10. A flow meter including in combination a conduit containing fluid flowing at a rate to be measured, means within said conduit for causing said fluid to have a differential pressure between two points in said conduit that is substantially proportional to the square of the flow rate of said fluid, means defining a passageway connected between said two points and containing electrically conductive fluid, electromagnetic pump means connected to said passageway for providing the fluid therewithin with a differential pressure between said two points in opposition to that within said conduit, the pressure provided by said pump means being substantially proportional to the square of the electric current therein, measuring means for indicating the value of said electric current, and means responsive to the fluid flow in said passageway and connected to said pump means for adjusting the value of said electric current until the differential pressures in said conduit and said passageway are equal, the current indicated by said measuring means then being directly proportional to the rate of flow of the fluid in said conduit.

GEORGE F. GARDNER.
THEODORE A. RICH.

References Cited in the file of this patent

UNITED STATES PATENTS

| Number | Name | Date |
|---|---|---|
| 803,029 | Threlfall | Oct. 31, 1905 |
| 1,291,056 | Mapelsden | Jan. 14, 1919 |
| 1,451,064 | Dunajeff | Apr. 10, 1923 |
| 1,518,279 | Smoot | Dec. 9, 1924 |
| 2,149,847 | Kolin | Mar. 7, 1939 |
| 2,269,068 | Corbin | Jan. 6, 1942 |
| 2,386,369 | Thompson | Oct. 9, 1945 |

FOREIGN PATENTS

| Number | Country | Date |
|---|---|---|
| 571,753 | France | Feb. 8, 1924 |